United States Patent [19]

Turner

[11] 3,708,884
[45] Jan. 9, 1973

[54] METHOD AND APPARATUS FOR MAKING STEREOSCOPIC DRAWINGS

[76] Inventor: Luis A. Turner, 8406 S.W. 58th Avenue, Portland, Oreg. 97219

[22] Filed: Nov. 13, 1970

[21] Appl. No.: 89,268

[52] U.S. Cl. ............................33/20 R, 33/76 R
[51] Int. Cl. ..............................B43l 13/18
[58] Field of Search ..................33/20 R, 76, 77

[56] References Cited

UNITED STATES PATENTS 2,587,585   3/1952   Ayres.................................33/20 R

*Primary Examiner*—Harry N. Haroian
*Attorney*—Oliver D. Olson

[57] ABSTRACT

Stereoscopic drawings are made by arranging master plan and front view drawing in spaced, longitudinal alignment, mounting a tracing sheet over the master front view drawing for lateral movement relative thereto, tracing on the tracing sheet each point on the master front view drawing that lies on a selected reference line extending longitudinally between corresponding points on both master drawings, moving the tracing sheet laterally from the reference line a distance proportional to the distance from a point on the master plan view drawing lying on the reference line to another point on the master plan view drawing displaced longitudinally from the reference line point, tracing on the tracing sheet each point on the master front view drawing that lies on the longitudinal line extending through said other point on the master plan view drawing, and repeating the moving and subsequent tracing steps for other longitudinally displaced points on the master plan view drawing. Related spaced points thus traced then are interconnected by free-hand or instrumented drawing. The tracing sheet then is displaced laterally from the master front view drawing and both are viewed through a stereoscope to ascertain the completeness and accuracy of the tracing sheet drawing and correspondence of character with the master front view drawing. Apparatus for performing the foregoing method includes a drawing support for the master drawings, an open framework support for the tracing sheet mounted for lateral movement relative to the master front view drawing, a straight edge mounted for movement longitudinally relative to the master plan view drawing and adjustable cam means interconnecting the framework support and straight edge for simultaneous proportional movement. A stereoscope also is mounted above the drawing support for use in viewing both master front view drawing and tracing drawing when said drawings are displaced laterally relative to each other.

15 Claims, 6 Drawing Figures

PATENTED JAN 9 1973 3,708,884

Luis A. Turner
Inventor
By
Oliver A. Olson
Agent

Luis A. Turner
Inventor

METHOD AND APPARATUS FOR MAKING STEREOSCOPIC DRAWINGS

BACKGROUND OF THE INVENTION

This invention relates to stereoscopic drawings, and more particularly to a novel method and apparatus for producing them.

The making of stereoscopic drawings, called stereographs, heretofore has been attempted primarily by time-consuming hand artistry, and therefore has been very limited because of the exorbitant cost. Apparatus provided heretofore for this purpose is characterized by several limitations, principal among which are the following: First, the operator, who must be a skilled artist, is required to decide, arbitrarily, a position of depth for each point on a master front view drawing, solely by visual inspection of the latter. This is an abstract and time-consuming procedure and contributes adversely to frustrations for the operator. Second, each selected position of depth then is established for the tracing drawing by shifting the latter laterally relative to the master front view drawing a corresponding distance predetermined by a fixed mathematical formula. Thus, the relative depths of objects in the drawing always are the same, regardless of whether the total apparent depth desired for the stereoscopic drawings reaches infinity or terminates at a close-up distance of but a few feet. This limitation imposes a severe restriction on the degree of versatility and ease with which the operator may manipulate the drawings to achieve stereoscopic accuracy and desired special effects.

SUMMARY OF THE INVENTION

In its basic concept, the method and apparatus of this invention involves the lateral displacement of a tracing sheet relative to an underlying master front view drawing through distances proportional to longitudinal distances between corresponding points on a master plan view drawing arranged in longitudinally spaced alignment with the master front view drawing.

It is by virtue of the foregoing basic concept that the principal objective of this invention is achieved; namely, to overcome the aforementioned disadvantages of prior methods and apparatus for producing stereoscopic drawings.

Another important object of this invention is the provision of a method of making stereoscopic drawings with speed and facility by relatively untrained personnel and which affords the artist a substantial degree of latitude for producing special effects.

Another important object of this invention is the provision of apparatus of the class described in which means is provided for varying the apparent depth of field of the resulting stereoscopic drawings over a substantial range.

Still another important object of this invention is the provision of apparatus of the class described which includes means for ascertaining the completeness of the tracing sheet drawing and correspondence of character with the master front view drawing.

A further important object of this invention is the provision of apparatus of the class described which is of simplified construction for economical manufacture, which is operable with speed and facility to produce stereoscopic drawings to a degree of precision and versatility heretofore unobtainable.

The foregoing and other objects and advantages of this invention will appear from the following detailed description taken in connection with the accompanying drawings of a preferred embodiment.

DESCRIPTION OF THE PREFERRED EMBODIMENT

Figure 2:
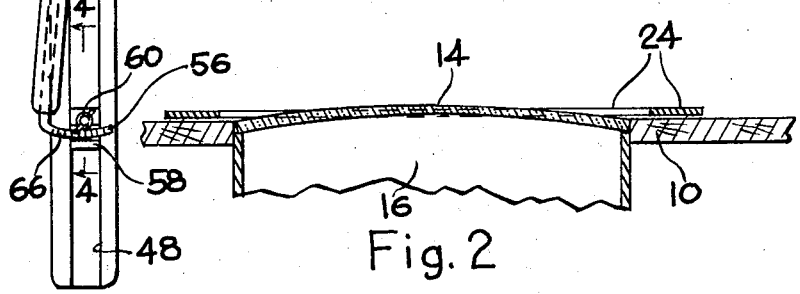
FIG. 2 is a fragmentary sectional view taken on the line 2—2 in FIG. 1.
Figure 3:
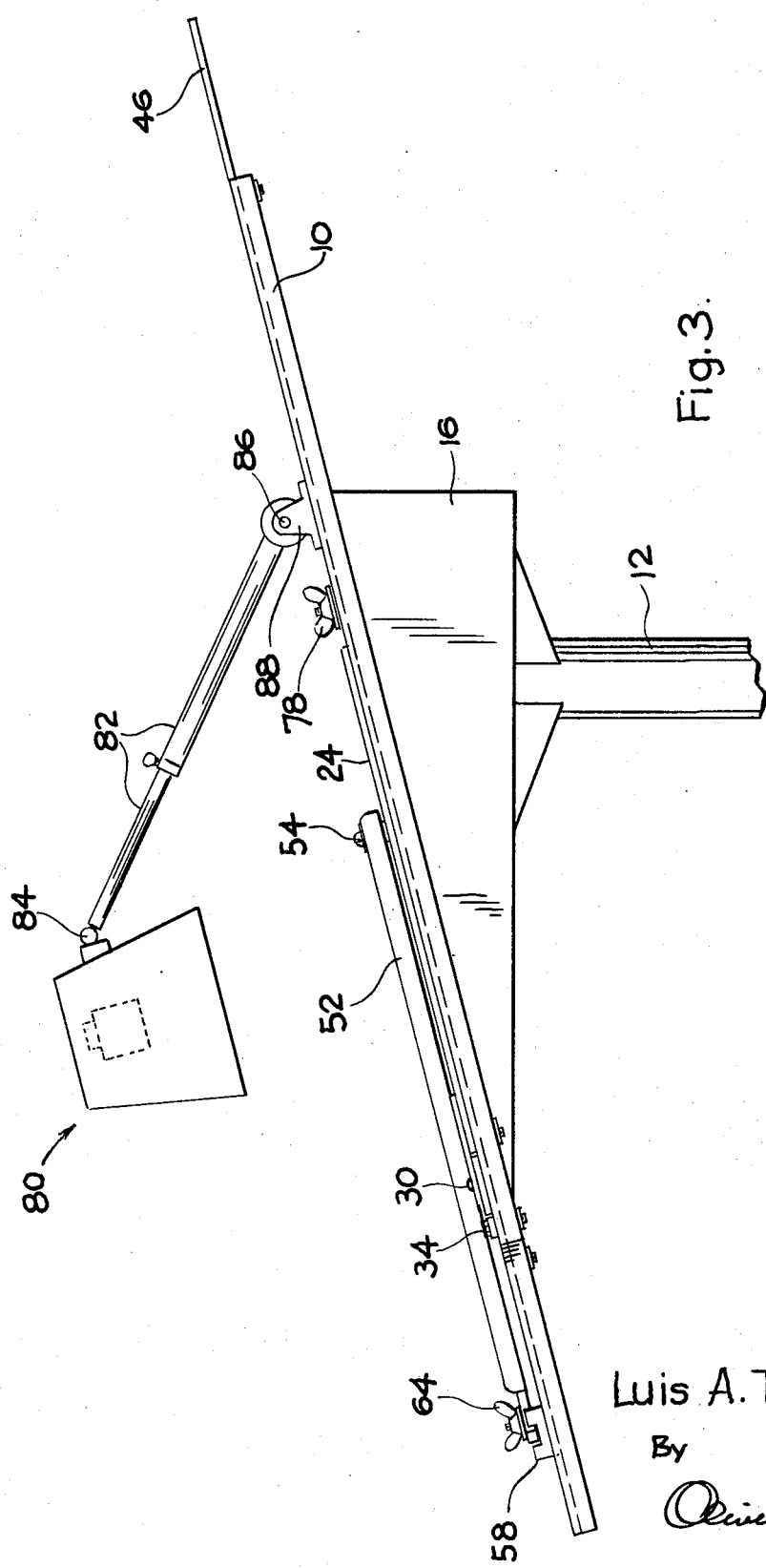
FIG. 3 is a fragmentary view in side elevation as viewed from the right in FIG. 1.

The apparatus illustrated in the drawings includes a drawing support 10, typically a drawing board of substantial dimensions, mounted on a pedestal base 12 (FIG. 3). One working area of the support, for example the lower left hand portion illustrated in FIG. 1, preferably is provided with a transparent window 14 through which light is emitted from a suitable source contained within the light box 16. Also, preferably, the transparent window is curved slightly arcuately in at least one direction, as illustrated in FIG. 2, to insure maximum contact between super-imposed drawing sheets. In this regard, a master front view drawing sheet 18 (FIG. 6), carrying the basic drawing, is secured over the light window, as by means of short strips of transparent adhesive tape 20, and over this master drawing sheet is disposed a transparent or translucent tracing sheet 22 upon which the companion drawing is to be developed, as explained more fully hereinafter.

Figure 6:
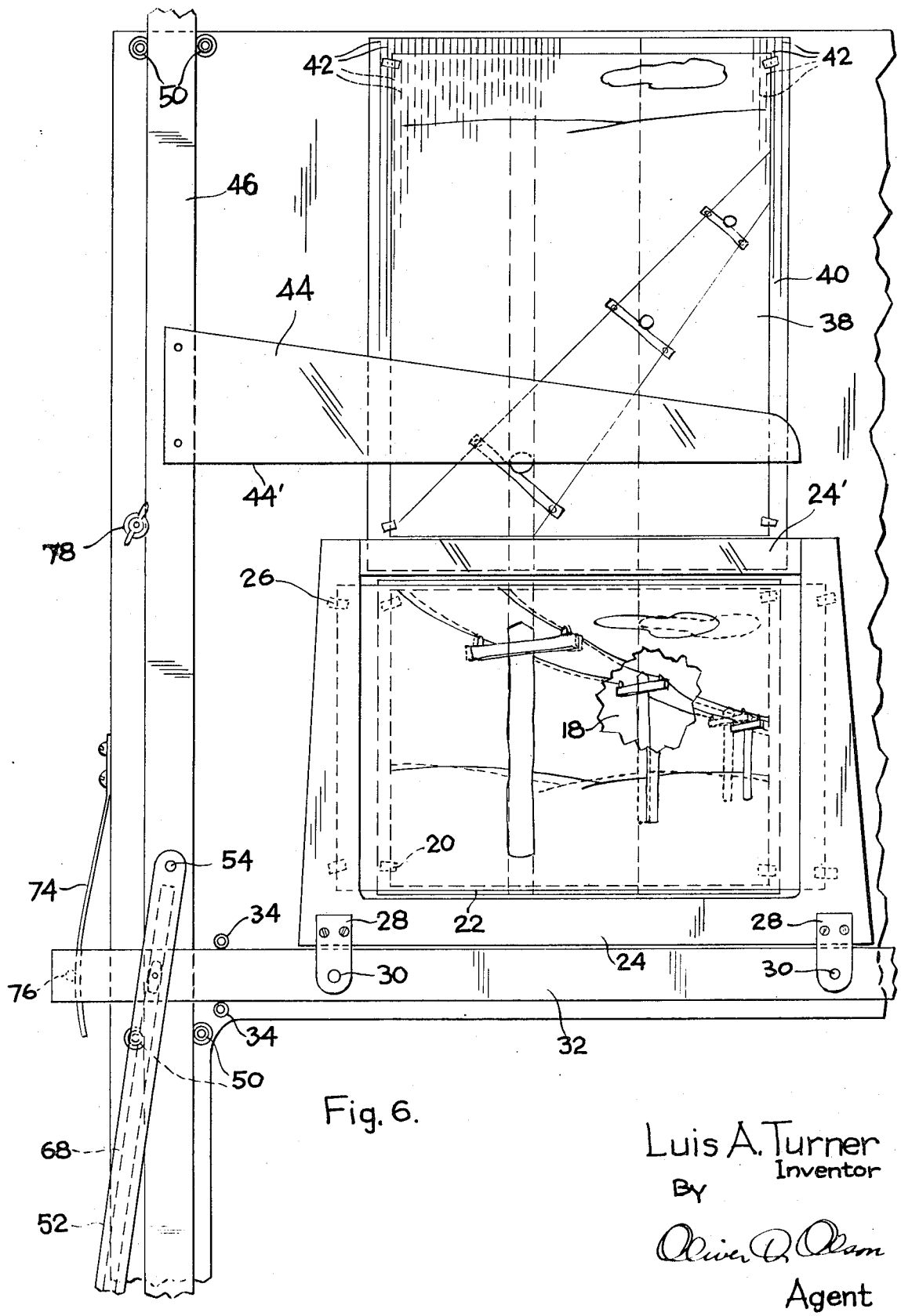
FIG. 6 is a fragmentary plan view, similar to FIG. 1, showing the association between master front and plan view drawings and a tracing sheet on which is traced the complimentary front view drawing for producing a pair of stereographs.

A support is provided for the tracing sheet. In the embodiment illustrated, the support comprises an open rectangular framework 24, the central opening of which is dimensioned to encompass the light window. The tracing sheet is adapted to be secured to the underside of the framework, as by means of short strips of adhesive tape 26 (FIG. 6). With the framework positioned in registry with the light window, the tracing sheet thus overlies the master front view drawing. The curvature of the window insures that the tracing sheet is held in positive contact with the underlying master drawing, thus providing maximum visibility of the latter through the tracing sheet. A brush may be wiped across the tracing sheet to expel any air trapped between the sheets.

Means is provided for mounting the tracing sheet support framework for lateral movement with respect to the underlying master drawing. In the embodiment illustrated, a pair of tabs 28 secured adjacent the lateral sides of the framework project rearward therefrom, i.e. toward the operator. The projecting portion of each tab is provided with an aperture for receiving releasably therein an anchor pin 30 projecting upward from a laterally elongated bar 32. The bar is mounted on the drawing support 10 and confined between opposed pairs of guide rollers 34, whereby the bar may be reciprocated on a laterally extending axis. Thus, with the tracing sheet support framework secured to the bar by the anchor pins, the tracing sheet is caused to move laterally therewith.

In accordance with the present invention, there is associated with the master front view drawing 18 a corresponding master plan view drawing 38. As shown in FIG. 6, the master front and plan view drawings are arranged in longitudinally spaced alignment, i.e. with their common center lines aligned on a common longitudinal line so that all components of the drawings are in longitudinal alignment. The master plan view drawing is secured to the drawing support in said position of alignment.

As an aid to identifying corresponding longitudinally aligned points on the master drawings 18 and 38, there preferably is provided on the drawing support 10 under the master plan view drawing 38 a sheet 40 of paper or other suitable material provided with a multiplicity of laterally spaced, longitudinally extending guide lines 42. The guide line sheet terminates closely adjacent the light window 14, and the latter also is provided with corresponding and longitudinally aligned guide lines 42'. For the purpose of viewing these lines at their meeting ends, the forward transverse member 24' of the support framework preferably is made of transparent plastic or other suitable material.

Associated with the master plan view drawing 38 is a transversely elongated straight edge member 44, preferably made of transparent material and provided with an elongated working straight edge 44'. This member is mounted for longitudinal reciprocation relative to the master plan view drawing. In the embodiment illustrated, this mounting is provided by a longitudinally elongated bar 46 mounted in a groove 48 in the drawing support 10 and confined between opposed pairs of guide rollers 50 for longitudinal reciprocation. The straight edge member is secured to the bar with the working straight edge preferably extending substantially normal to the axis of reciprocation of the bar.

Figure 4:
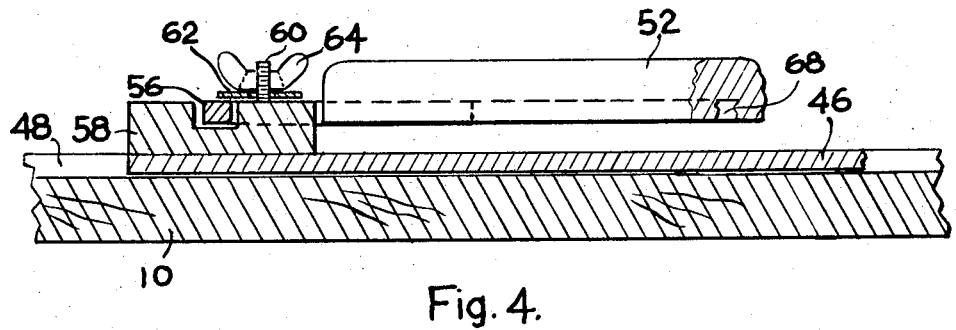
FIG. 4 is a fragmentary sectional view taken on the line 4—4 in FIG. 1.
Figure 5:
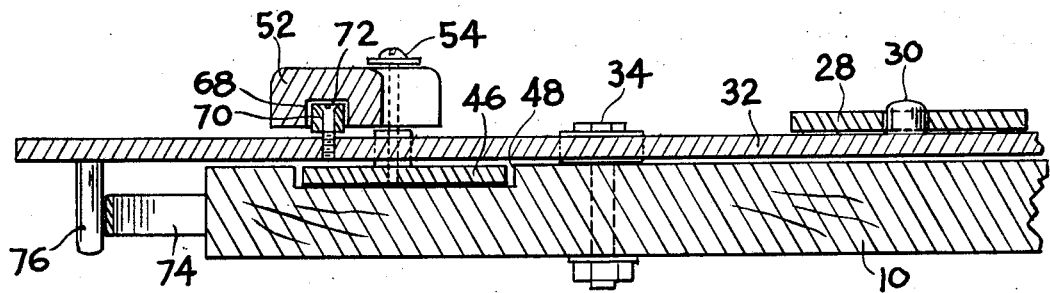
FIG. 5 is a fragmentary sectional view taken on the line 5—5 in FIG. 1.

Means is provided for interconnecting the bars 32 and 46 in such manner as to effect lateral movement of the bar 32 simultaneously with longitudinal movement of the bar 46. Further, such interconnecting means preferably provides for varying the relative distances of movement of said bars, for purposes explained more fully hereinafter. To this end an elongated cam member 52 is secured pivotally at one end to the longitudinally reciprocative bar 46, as by means of the pivot pin 54. The cam member extends rearwardly at a slight angle with respect to the bar and its rearward end terminates in a laterally offset anchor member 56. This anchor member is received freely in a transverse groove (FIG. 4) in a block 58 secured to the bar. The anchor member is curved arcuately on the radius of the pivot pin 54. Clamping means is provided on the block for releasably clamping the anchor member thereto. In the embodiment illustrated the clamping member comprises a threaded bolt 60 which projects upward from the block and receives a clamping washer 62 and wing nut 64. The washer overlies the anchor member 56 and thus secures the latter frictionally to the block when the wing nut is tightened down. The anchor member preferably is provided with a graduated scale 66 which functions in the manner described hereinafter.

The cam member 52 is coupled to the laterally reciprocative bar 32 to effect reciprocation of the latter simultaneously with longitudinal reciprocation of the bar 46. In the embodiment illustrated, the underside of the cam member is provided with an elongated groove 68 which slidably receives a guide block 70 mounted rotatably on a bolt 72 anchored in the bar 32. Thus, as the cam member is reciprocated longitudinally with the bar 46, the guide block 70 slides along the groove 68 and thus causes simultaneous lateral reciprocation of the bar 32.

To minimize errors due to backlash during reciprocation of the cam member, a leaf spring 74 is secured at one end to the edge of the drawing support 10 and abuts resiliently adjacent its opposite, free end against a pin 76 projecting downward from the bar 32. The spring thus urges the bar 32 resiliently toward the left in FIG. 1, to maintain the guide block in sliding engagement always with the outer surface of the guide groove 68 in the cam member.

The ratio of distances of longitudinal movement of the bar 46 and lateral movement of the bar 32 is variable, as determined by the degree of angular offset of the cam member 52 relative to the longitudinal axis of the bar 46. Thus, for example, if the included angle between the cam member and the bar is increased from the position illustrated in FIG. 1, by loosening the wing nut 64 and rotating the cam member clockwise about the pivot pin 54, the distance of lateral movement of the bar 32, for a given distance of longitudinal movement of the bar 46, is increased.

A clamp screw 78 is mounted on the drawing board 10 adjacent the bar 46 for securing the latter in selected positions of longitudinal adjustment.

The illustrated arrangement of the cam member connection to bar 32 is designed for a master front view drawing 18 which constitutes the left drawing of a pair of stereoscopic drawings. Accordingly, the tracing drawing developed therefrom becomes the right drawing of the pair, as will be understood.

A conventional stereoscope 80 also is mounted on the drawing support 10 for use in comparing the drawing developed on the tracing sheet with the master front view drawing, to determine the completeness of the tracing drawing and its correspondence in character (line width, line density, etc.) with the master drawing. For this purpose the stereoscope is mounted on the free end of an extensible arm 82, preferably by means of a ball joint connector 84. The opposite end of the arm is connected by a friction pivot 86 to a mounting bracket 88 secured to the drawing support. The stereoscope thus is adjustable between a retracted position (FIG. 1) upward and forward of the front view drawings and an operative position (FIG. 3) overlying the drawings. For this purpose the framework 24 supporting the tracing sheet 22 is removed from the anchor pins 30 and placed upon the drawing support 10 adjacent the master front view drawing on the light window, as indicated in broken lines in FIG. 1. The stereoscope then is adjusted, by means of the friction pivot 86 and the ball joint connector 84, to register with both front view drawings, as will be understood.

The operation of the apparatus described hereinbefore now will be described, with reference primarily to FIG. 6 of the drawings. Therein is shown a master front view drawing 18 secured over the light window. Spaced longitudinally forward of and in longitudinal alignment with the master front view drawing is a corresponding master plan view drawing 38 secured over the guide line sheet 40.

For purposes of illustration the master drawings illustrate a pair of utility lines supported by and extending between a plurality of cross bars on corresponding utility poles. The arrangement depicts the lines and poles arranged in a row receding from left to right.

It is to be noted that the master plan view drawing illustrates the utility line assembly as receding from the left front corner of the drawing angularly toward the right rear corner at a given angle. If desired, the artist may modify this angle to produce desired effects, it being necessary only that the components of the drawings remain in longitudinal alignment.

The tracing sheet 22 is secured to the underside of the framework support 24, as indicated, and the latter is secured to the transverse bar 32 by means of the anchor pins, as previously described. Then, by grasping the cam member 52 the bar 46 is moved longitudinally to bring the straight edge 44' into alignment with that portion of one of the objects of the drawing which is desired to be located at the front plane of the stereoscopic drawing. In the illustration the object thus chosen is the diametric center of the leftward-most utility pole. In this position the diametric vertical sides of that pole are traced on the tracing sheet from the master front view drawing underneath it. Also, the points of intersection of the straight edge with the utility lines also are traced on the tracing sheet from the underlying master front view drawing at points which are in longitudinal alignment. For this purpose the underlying longitudinal guide lines 42 and 42' on the sheet 40 and window 14 are used to advantage.

To illustrate a special effect, a portion of the cross bar on the left-wardmost pole extends forward of the front plane of the drawing. By moving the straight edge rearward to intercept selected points on said cross bar, the tracing sheet thus is moved toward the right with respect to its initial position. The points on the plan view drawing intercepted by the straight edge then are traced on the tracing sheet from the underlying master front view drawing as before. When completed, as explained hereinafter, this portion of the stereoscopic drawing will appear to project from the plane of the stereoscopic drawing toward the eyes of the observer.

By manipulation of the cam member the straight edge is moved to successive positions toward the back edge of the master plan view drawing to intersect desired points on the master plan view drawing to the right of the reference position illustrated by the straight edge in FIG. 6. With each successive movement of the straight edge the tracing sheet is moved correspondingly toward the left from the reference position. Points on the master plan view drawing intersected by the straight edge then are traced on the tracing sheet from corresponding longitudinally aligned positions on the master front view drawing, as previously described, until all of the objects in the master drawings have been at least outlined by spaced points traced on the tracing sheet. These spaced points then are interconnected by free hand or instrumented drawing.

It is to be noted that the displacement of corresponding lines on the master front view drawing and the overlying tracing sheet increases progressively as the apparent depth of field increases. This displacement may be increased or decreased, as desired, by loosening the wing nut 64 and pivoting the cam member 52 arcuately about its pivot pin 54 in the clockwise or counterclockwise directions, respectively. For example, it may be assumed that in the position of adjustment illustrated the tracing support framework 24 will be moved toward the left from the reference position illustrated, one inch during movement of the straight edge 44' from the illustrated reference position to the back edge of the master plan view drawing. This one inch designation is identified on the graduated scale 66, and this setting produces a certain optical effect of depth of field to the observer of the stereoscopic drawings. Various other effects are produced by varying this ratio of distances.

Figure 1:
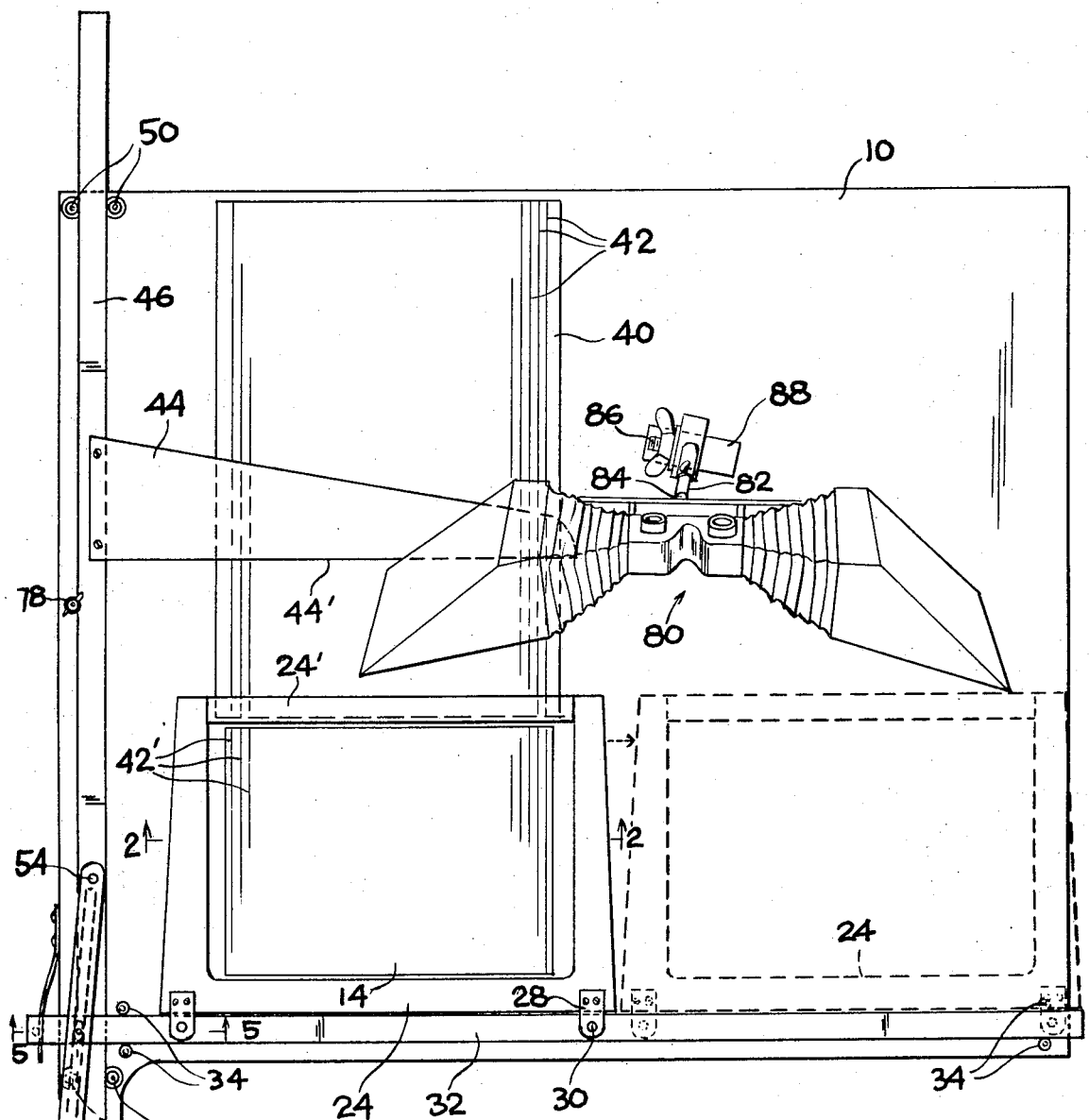
FIG. 1 is a plan view of apparatus embodying the features of this invention for making stereoscopic drawings.

When the tracing drawing is complete, the support framework 24 is removed from the anchor pins and positioned on the drawing support 10 to the right of the master plan view drawing, as indicated in broken lines in FIG. 1. The stereoscope 80 then is moved into operative position for viewing both drawings simultaneously. By this means the tracing drawing may be inspected for completeness and for correspondence of line width, line density and other characteristics with respect to the master front view drawing. Discrepancies between the drawings then may be corrected.

As explained hereinbefore, the master front view drawing illustrated is the left view of the stereoscopic drawing pair and the tracing sheet drawing the right view of the pair. These may be reversed, if desired, merely by providing the cam member 52 with an anchor member 56 that projects to the left rather than to the right as illustrated. Such an arrangement operates to move the tracing sheet support framework toward the right as the straight edge 44' is moved toward the back edge of the master plan view drawing, as will be understood. The entire assembly may be inverted, if desired, for most effective use by left handed operators.

When the right and left drawings have been completed they are transferred photographically or otherwise to transparent or opaque sheets for appropriate coloring by artists. These then are photographed and reduced to appropriate size for mounting on discs or other form of holders for viewing with a stereoscopic viewer. By virtue of the lateral displacements of corresponding objects in the left and right drawings, the observer views the composite scene with full three dimension effect.

It will be apparent to those skilled in the art that various changes may be made in the method steps and in the size, shape, number, type and arrangement of parts described hereinbefore. For example, if it is desired that no portion of the drawing appear to project from the plane of the drawing toward the eyes of the observer, the reference line established by the straight edge 44' will be at that point on the master plan view drawing closest to the master front view drawing. As another example, the tracing sheet may be positioned laterally adjacent the master front view drawing, rather than over it, and a pantograph or other remote type tracing mechanism utilized to mark corresponding points on the tracing sheet. The superimposed arrangement is preferred for its simplicity, accuracy and greater speed of performance. As a further example, the straight edge member 44 may mount or otherwise cooperate with a second straight edge member arranged for movement perpendicular thereto, to replace the guide lines 42 and 42'. The latter arrangement is preferred, however, for its simplicity. As another example, the guide lines 42 may be constructed directly on the drawing support 10 and the guide lines 42' may be constructed directly on the light window 14 or on a transparent sheet overlying the window. As still another example, the illustrated cam arrangement for coupling the bars 32 and 46 together for simultaneous proportional movement may be replaced by other forms of couplings, such as interchangeable gear systems interengaging racks on the bars and adjustable pulley systems interengaging the bars. The cam arrangement illustrated is preferred for its simplicity and infinite adjustability. As a further example, special effects can be achieved by arranging the straight edge 44' at oblique angles relative to the axis of reciprocation of the bar 46. These and other changes may be made without departing from the spirit of this invention.

Having now described my invention and the manner in which it may be used, I claim:

1. The method of making stereoscopic drawings, comprising
   a. arranging master front and plan view drawings in spaced, longitudinal alignment,
   b. arranging a tracing sheet in a cooperative relation to the master front view drawing for marking on the tracing sheet selected points on the master front view drawing,
   c. marking on the tracing sheet each point on the master front view drawing that lies on a selected reference line extending longitudinally between corresponding points on both master drawings,
   d. moving the tracing sheet relative to the master front view drawing laterally from said reference line successive distances proportional to the distances from a point on the master plan view drawing lying on said reference line to other points on the master plan view drawing displaced longitudinally from the reference line point, and
   e. after each of said moves marking on the tracing sheet each point on the master front view drawing that lies on the longitudinal line extending through each of said other points on the master plan view drawing.

2. The method of claim 1 wherein the tracing sheet is arranged over the master front view drawing for direct tracing.

3. The method of claim 1 wherein at least some of the related points marked on the tracing sheet are spaced apart, and including the step of interconnecting said spaced points by free hand drawing.

4. The method of claim 1 including the step of displacing the master front view drawing and tracing sheet drawing laterally, and viewing both drawings simultaneously through a stereoscope for comparing the tracing sheet drawing and master front view drawing.

5. Apparatus for making stereoscopic drawings, comprising
   a. a drawing support adapted to support master front and plan view drawings in spaced, longitudinal alignment,
   b. a tracing sheet support member mounted on the drawing support for movement laterally thereof and for disposing a tracing sheet in cooperative relation to a master front view drawing,
   c. a straight edge member mounted on the drawing support for cooperative registration with a master plan view drawing and for movement longitudinally of the drawing support toward and away from the tracing sheet support member, and
   d. coupling means interchanging the tracing sheet support member and straight edge member for effecting simultaneous proportional movement of said members.

6. The apparatus of claim 5 wherein the coupling means includes adjustment means for varying the ratio of relative movement of said members.

7. The apparatus of claim 5 including guide line means extending longitudinally of the drawing support and arranged for cooperation with master front and plan view drawings for aligning longitudinally corresponding points on said drawings.

8. The apparatus of claim 7 wherein the guide line means comprises a plurality of laterally spaced longitudinal lines on the drawing support arranged to underlie master front and plan view drawings.

9. The apparatus of claim 5 wherein the drawing support includes a light window arranged to mount thereon a master front view drawing.

10. The apparatus of claim 9 wherein the light window is curved convexly outward in at least one direction.

11. The apparatus of claim 5 including stereoscope means on the drawing support arranged retractably for viewing simultaneously a master front view drawing and a tracing drawing produced therefrom.

12. The apparatus of claim 5 wherein
   a. the tracing sheet support member includes an elongated bar mounted on the drawing support for lateral reciprocation,
   b. the straight edge member includes an elongated bar mounted on the drawing support for longitudinal reciprocation, and
   c. the coupling means interengages said elongated bars.

13. The apparatus of claim 12 wherein the coupling means comprises an elongated cam member connected to the bar of the straight edge member, and cam follower means connected to the bar of the tracing sheet support member and slidably engaging the cam member.

14. The apparatus of claim 13 wherein the cam member is connected to the bar of the straight edge member for adjustment angularly with respect to the longitudinal axis of reciprocation of said bar to vary the ratio of relative movement of said bars.

15. The apparatus of claim 5 wherein
   a. the tracing sheet support member includes an elongated bar mounted on the drawing support for lateral reciprocation, b. the straight edge member includes an elongated bar mounted on the drawing support for longitudinal reciprocation,
c. the coupling means comprises an elongated cam member connected to the bar of the straight edge member, and cam follower means connected to the bar of the tracing sheet support member and slidably engaging the sam member,
d. the cam member being connected to the bar of the straight edge member for adjustment angularly with respect to the longitudinal axis of reciprocation of said bar to vary the ratio of relative movement of said bars,
e. and wherein the apparatus includes guide line means extending longitudinally of the drawing support and arranged for cooperation with master front and plan view drawings for aligning longitudinally corresponding points on said drawings.

* * * * *